April 21, 1931.   D. D. HEIMBURGER   1,801,553
CAR WASHING APPARATUS
Filed May 21, 1928   3 Sheets-Sheet 1
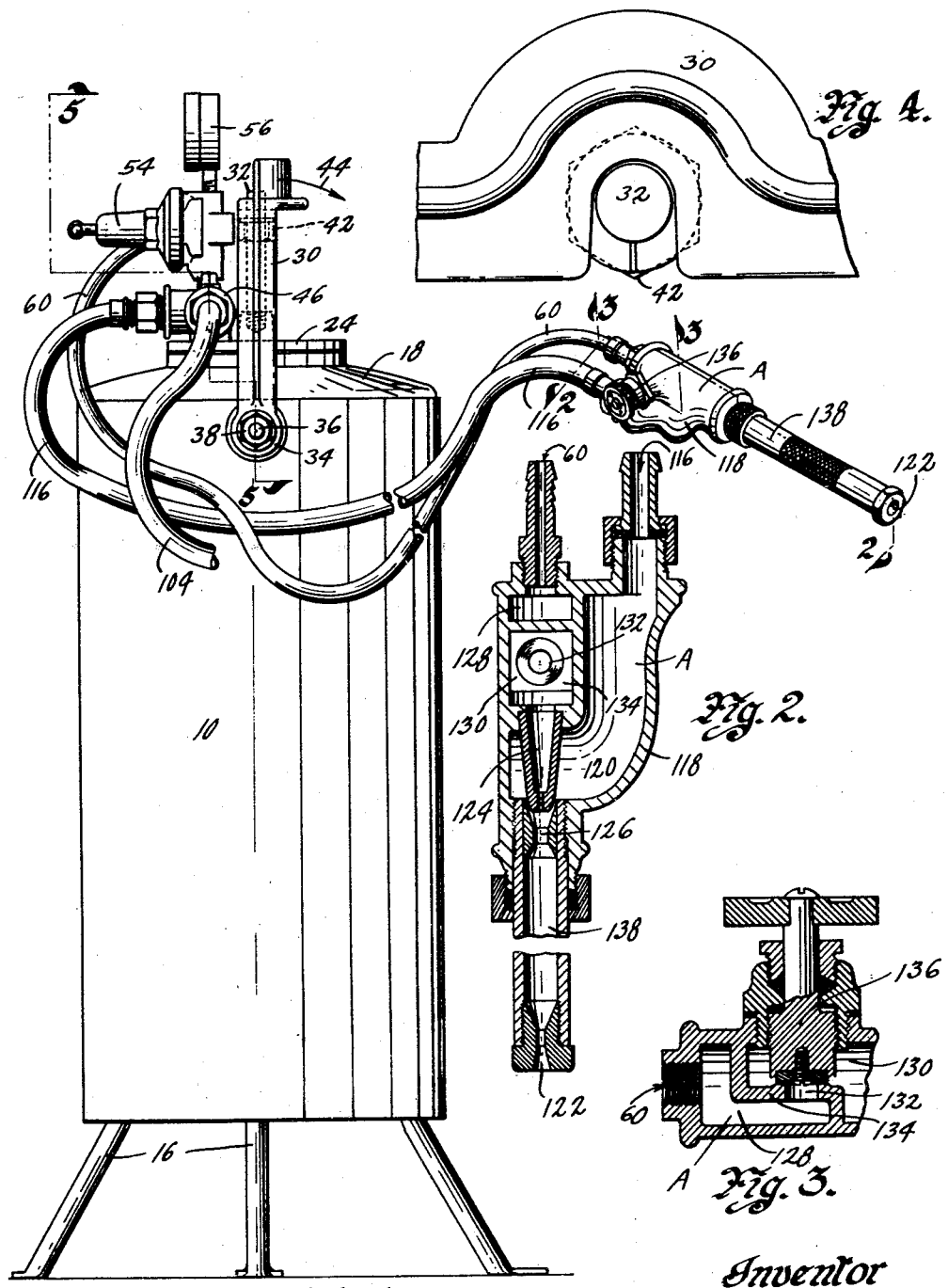
Witness
Vincent Brown.
Inventor
Douglas D. Heimburger
by Bair, Freeman & Sinclair Attorneys

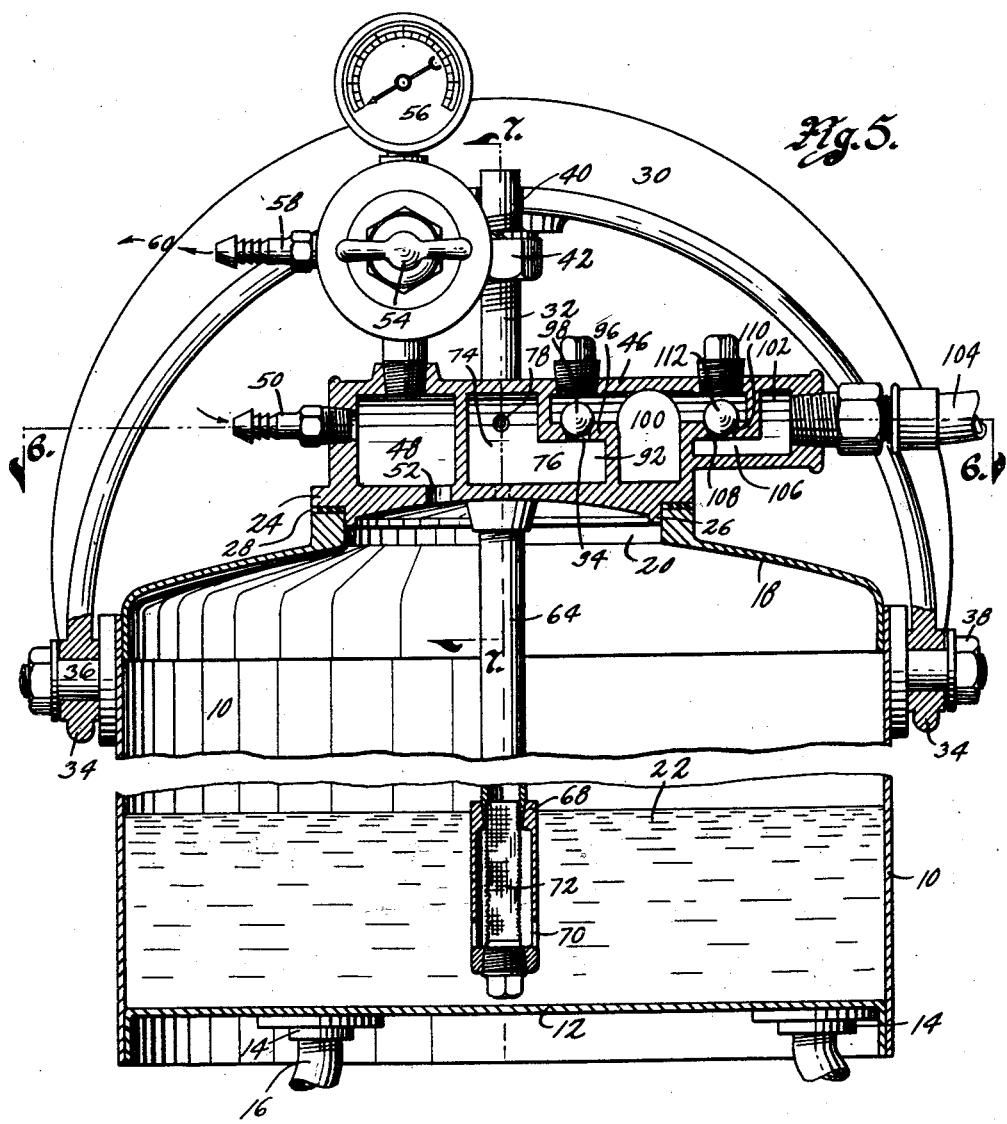

April 21, 1931.  D. D. HEIMBURGER  1,801,553
CAR WASHING APPARATUS
Filed May 21, 1928   3 Sheets-Sheet 3

Witness
Ray Rusher

Inventor
Douglas D. Heimburger
by Bair, Freeman & Sinclair Attorneys

Patented Apr. 21, 1931

1,801,553

UNITED STATES PATENT OFFICE

DOUGLAS D. HEIMBURGER, OF ST. LOUIS, MISSOURI, ASSIGNOR TO MARQUETTE MANUFACTURING COMPANY, OF ST. PAUL, MINNESOTA

CAR-WASHING APPARATUS

Application filed May 21, 1928. Serial No. 279,261.

The object of my invention is to provide an apparatus for the purpose of washing cars by a spray of air, water and liquid soap, the parts of my device being of comparatively simple, durable and inexpensive construction.

More particularly, it is my object to provide a container in which liquid soap is placed, with a cover for the container, including a chamber for receiving air and water, and including a means for supplying this air and water and the liquid in the tank to a spray nozzle for the purpose of washing an automobile.

Still a further object is to provide the entire lid of the tank in the form of a unit, which may be removed from the tank for filling purposes, and replaced thereon for operation of the device, all the air and water connections and connections to the spraying nozzle being attached to this unit.

Still a further object is to provide on the lid of the tank a chamber comprising a plurality of compartments for receiving the water and air and for mixing the liquid in the container with the water before it is supplied to the air nozzle, means being provided in connection with the lid for supplying air to the spraying nozzle at a predetermined pressure lower than the supply of air to the chamber on the lid of the tank.

With these and other objects in view, my invention consists in the construction, arrangement and combination of the various parts of my device, whereby the objects contemplated are attained, as hereinafter more fully set forth, pointed out in my claims, and illustrated in the accompanying drawings.

Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a side elevation of the tank, illustrating my unit in position thereon, and connected to a spraying nozzle, whereby the entire arrangement forms a car washing apparatus.

Figure 2 is an enlarged, sectional view through the spraying nozzle device, as taken on the line 2—2 of Figure 1.

Figure 3 is an enlarged, sectional view through a control valve of the nozzle for controlling the flow of the air to the nozzle.

Figure 4 is an enlarged plan view of the central portion of a bail, which is used for holding the lid of the tank in closed position.

Figure 5 is an enlarged, sectional view taken on the line 5—5 of Figure 1.

Figure 6:
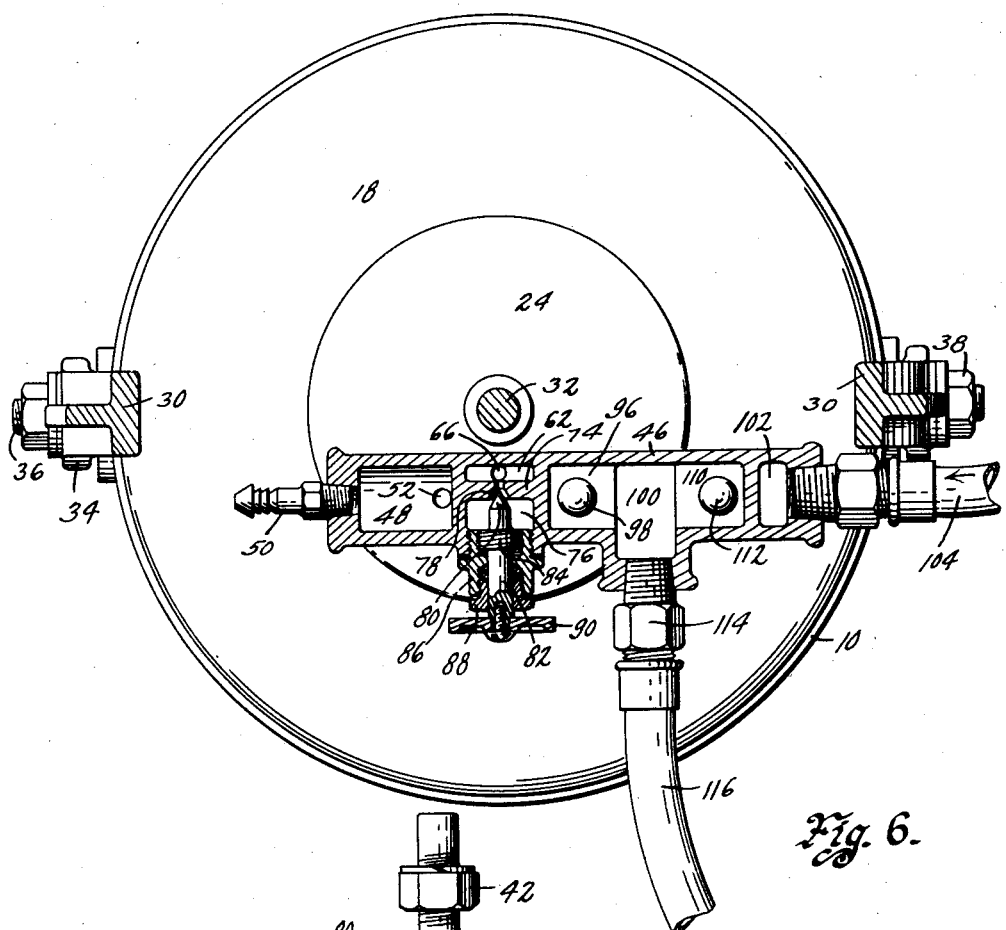
Figure 6 is a sectional view taken on the line 6—6 of Figure 5, illustrating the top of the container in plan elevation.
Figure 7:
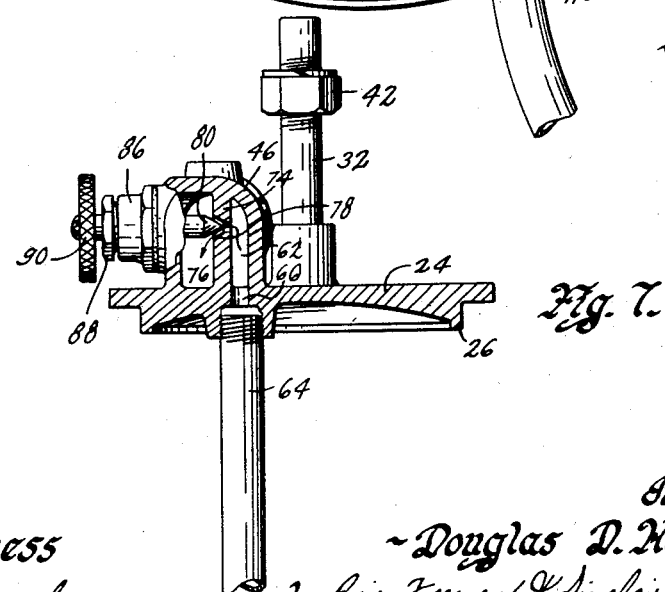
Figure 7 is a sectional view taken on the line 7—7 of Figure 5, illustrating a control valve.

In the accompanying drawings, I have used the reference numeral 10 to indicate a tank. The tank 10 is formed with a bottom 12, having screw-threaded bosses 14 thereon, in which leg members 16 are secured for the purpose of supporting the tank. The leg members 16 may extend outwardly as clearly shown in Figure 1 of the drawings for the purpose of providing a large supporting base for the tank 10.

The top 18 of the tank is formed with an opening 20 through which a liquid 22 may be introduced into the tank 10. This liquid may be a liquid soap or any other suitable liquid desirable for dissolving grease or dirt accumulated on the body and chassis of an automobile.

The opening 20 is normally closed by a cover member 24. The cover member 24 is provided with an annular flange 26 to properly position it relative to the opening 20, and a gasket 28 is interposed between the top 18 of the tank and the cover member 24. For holding the cover member 24 down against the gasket 28, I provide a bail 30 and thrust rod 32.

The bail 30 is provided at each of its ends with perforated ears 34 adapted to be rotatably positioned on studs 36 extending from the sides of the tank 10. Nuts 38 serve to hold the bail 30 in proper position relative to the studs 36 and yet allow the bail to rotate on them.

The central portion of the bail 30 is provided with a U-shaped notch 40, as shown in Figure 4 of the drawings, between the sides of which the thrust rod 32 is positioned, when the cover member 24 is in position to cover the opening 20. A nut 42 is then utilized for forcing the thrust rod 32 downwardly relative to the bail 30.

From the foregoing description, it will be obvious that the cover member 24 may easily be removed by loosening the nut 42 and then swinging the bail 30 in the direction of the arrow 44, whereafter the cover member may be lifted from the tank 10.

Formed on the cover member 24 is a housing 46 having formed therein a compartment 48.

An air hose fitting 50 communicates with the compartment 48 and on to this fitting an air hose may be positioned and connected with an air compressor for supplying air under pressure to the compartment 48. This pressure may be of any value desirable and I have found that between one hundred and twenty-five and one hundred and fifty pounds per square inch works best.

An opening 52 is formed in the cover member 24, whereby the pressure of air in the compartment 48 may act upon the liquid 22 for creating a pressure on it for the purpose of expelling it from the container.

A reducer valve 54 is screwed into an upstanding boss on the housing 46 and communicates with the compartment 48 for the purpose of receiving air therefrom. This valve is of the ordinary construction, including a pressure gauge 56 to indicate the number of pounds per square inch of air being expelled from the reducer valve 54. This air is expelled through a fitting 58, which is connected by a hose 60 to the spraying or car washing nozzle A. By means of the reducer valve, a predetermined pressure of air may be at all times supplied to the nozzle A, regardless of the pressure of air within the compartment 48.

Within the housing 46, a compartment 62 is provided. This compartment is in communication with a pipe 64, which extends down into the liquid soap 22 for the purpose of conducting such soap into the compartment 62. Means of communication between the compartment 62 and the pipe 64 is afforded by an opening 66.

The lower end of the pipe 64 is provided with a strainer device, consisting of a casing 68 having openings 70 therein and having inside of the casing a strainer screen 72. The soap 22 after entering the openings 70 must pass through the strainer 72 before it can be forced into the pipe 64.

One side of the compartment 62 is bounded by a partition wall 74 and a compartment 76 is formed on the other side of this partition. A valve seat 78 is formed in the partition 74 and is adapted to have coact therewith a valve needle 80, whereby the flow of liquid soap from the compartment 62 to the compartment 76 may be controlled as desired. The valve needle 80 is formed on a stem 82 having an enlarged screw-threaded portion 84 adapted to coact with threads in a bushing 86. The bushing 86 is screwed into the casing 46 and is provided with a packing nut 88 to prevent the leakage of liquid around the stem 82.

A hand wheel 90 is provided on the outer end of the stem for rotating the valve stem and valve needle 80 and thereby moving it toward or away from the valve seat 78.

As clearly illustrated in Figure 5, the compartment 76 has an extension 92 in communication with an opening 94 through a partition 96. The opening 94 is formed with a ball seat 96 in its upper surface and a ball 98 coacts with this seat by gravity for forming a check valve.

After liquid soap passes through the opening 94, it enters a compartment 100.

A compartment 102 is formed in the end of the casing 46 opposite the compartment 48, and water under pressure is supplied to this compartment from a water hose 104. The water in this case may be ordinary city water, which is usually under a pressure of from forty to sixty pounds per square inch.

The compartment 102 has an extension 106 in communication with an opening 108 formed in a partition 110. The upper end of the opening 108 is in the form of a ball seat, and a check ball 112 coacts with this seat for the purpose of forming a check valve to allow the inflow of water to the compartment 100 and to prevent a backflow thereof.

The compartment 100 is in communication with a hose fitting 114 to which is connected a hose 116. The hose 116 extends to the washing nozzle A.

The nozzle A may be of any desired construction in which the air from the hose 60 and the liquid from the hose 116 may be mixed, and by way of illustration, I have shown one of the type as set forth in Figures 1, 2 and 3 of my drawings. I will briefly describe this nozzle.

The nozzle consists of a body portion 118, in which is formed a liquid chamber 120.

Liquid entering this chamber is expelled from the discharge nozzle 122 of the device after passing around an ejector nozzle 124 and entering a Venturi fitting 126.

The discharge end 122 of the nozzle A is also Venturi-shaped.

An air chamber 128 is formed in the body portion 118 for receiving air from the hose 60. This chamber communicates with a chamber 130 by means of an opening 132 formed in a partition wall 134. A valve member 136 coacts with the partition 134 for cutting off the supply of air or for regulating it as desired.

The chamber 130 communicates with the interior of the ejector nozzle 124, whereby air may be supplied into the stream of liquid flowing through the Venturi fitting 126. The liquid enters a mixing chamber 138 as it leaves the Venturi fitting 126 and in passing through the Venturi fitting assumes a tubular formation, the air being discharged into the center of this tubular formation.

The air and liquid is then thoroughly mixed in the mixing chamber 138 and is forcibly discharged through the Venturi discharge end 122 in the form of a fine mist.

*Practical operation*

In the operation of my device, the tank 10 is filled with a liquid soap or other desirable substance in liquid form and the cover member 24 is then securely fastened in position by means of the bail 30 and by manipulation of the nut 42.

All connections from the water supply and air supply are made to the unit, consisting of the cover member 24 and all the parts secured thereto and all connections are also made to the spraying nozzle A.

The reducer valve 54 is manipulated for obtaining the desired pressure of air to be discharged into the nozzle A.

A faucet for controlling the supply of water through the hose 104 and into the compartment 100 is turned on.

The valve needle 80 is manipulated for discharging the proper amount of liquid 22 into the compartment 100, which discharge is caused by the pressure of air in the container 10.

The mixing tube 138 of the nozzle A may be screwed inwardly to shut off the supply of liquid, and the valve 136 may be in closed position.

When it is desired to wash an automobile, the air valve 136 in the nozzle A may be opened, and the tube 138 may be screwed outwardly, so that the Venturi fitting 126 no longer contacts with the ejector nozzle 124, whereupon the air and liquid will be discharged from the nozzle A.

As soon as the liquid starts flowing from the nozzle, the pressure of air in the container 10 will supply additional soap to the compartment 100 of the casing 46. The flow of soap, prior to allowing the liquid to be discharged from the nozzle A, is prevented by the check valve 112, which prevents the soap from flowing into the water hose 104, even though the pressure thereon is greater than the water pressure.

In the event that the water pressure is greater than the pressure on the liquid soap, the check valve 98 functions to prevent water flowing into the container 10.

From the description of my invention, it will be apparent, that I have provided a unitary device adapted to have all connections made thereto, and to in turn be connected to the car washing nozzle, whereby the container 10 may be easily filled and then by merely inserting the cover plate in position and turning on the air supply through the fitting 50, a pressure will be exerted on the soap solution without any additional air connection being made.

Some changes may be made in the construction and arrangement of the various parts of my car washing apparatus, without departing from the real spirit and purpose of my invention, and it is my intention to cover by my claims, any modified forms of structure or use of mechanical equivalents, which may be reasonably included within their scope.

I claim as my invention:

1. In a device of the class described, a container, liquid therein, a cover for said container, said cover being chambered to provide a plurality of compartments, means for supplying air under pressure to one of said compartments, a nozzle, a conduit from said compartment to said nozzle for supplying air under pressure thereto, a reducing valve structure interposed between said compartment and said conduit, means of communication between said compartment and the interior of said container to exert air pressure on the surface of said liquid, a pipe leading from another of said compartments to below the level of said liquid, a third one of said compartments being separated from the second mentioned compartment by a wall having an opening therein, check valve means associated with said opening and closing toward the second compartment, a fourth one of said compartments being separated from the third compartment by a wall having an opening therein, check valve means associated with said opening and closing toward the fourth compartment, means for supplying water under pressure to said fourth compartment and a conduit from said fourth compartment to said nozzle for supplying liquid from the container and water under pressure thereto.

2. In a device of the class described, a container, liquid therein, a cover for said container, said cover being chambered to provide a plurality of compartments, means for supplying air under pressure to one of said compartments, a nozzle, a conduit from said compartment to said nozzle for supplying air under pressure thereto, a reducing valve structure interposed between said chamber and said conduit, means of communication between said compartment and the interior of said container to exert air pressure on the surface of said liquid, a pipe leading from another of said compartments to below the level of said liquid, said second compartment having a partition therein, an opening thru said partition, a valve seat around the opening, a valve coacting with the opening and including a stem extending outside said cover, said pipe communicating with said second compartment on one side of said partition, a third one of said compartments being separated from the space on the other side of said partition of the second mentioned compartment by a wall having an opening therein, check valve means associated with said opening and closing toward the second compartment, a fourth one of said compartments being separated from the third compartment by a wall having an opening therein, check valve means associated with said opening and closing toward the fourth compartment, means for supplying water under pressure to said fourth compartment and a conduit from said fourth compartment to said nozzle for supplying liquid from the container and water under pressure thereto.

3. In a device of the class described, a container, liquid therein, the top of said container being chambered to provide a plurality of compartments, means for supplying air under pressure to one of said compartments, a nozzle, a conduit from said compartment to said nozzle for supplying air under pressure thereto, means of communication between said compartment and the interior of said container to exert air pressure on the surface of said liquid, a pipe leading from another of said compartments to below the level of said liquid, a third one of said compartments being separated from the second mentioned compartment by a wall having an opening therein, check valve means associated with said opening and closing toward the second compartment, a fourth one of said compartments being separated from the third compartment by a wall having an opening therein, check valve means associated with said opening and closing toward the fourth compartment, means for supplying water under pressure to said fourth compartment and a conduit from said fourth compartment to said nozzle for supplying liquid from the container and water under pressure thereto.

4. In a device of the class described, a container, liquid therein, a chambered cover for said container having a plurality of compartments, two of said compartments communicating thru check valves with the third one in a direction from the two compartments towards the third one, a pipe from one of said two compartments extending below the level of said liquid, means for supplying pressure to the surface of the liquid to force it thru said pipe, means for supplying water under pressure to the second of said two compartments, a conduit leading from the third compartment and a nozzle connected to the outer end of said conduit.

Des Moines, Iowa, April 12, 1928.

DOUGLAS D. HEIMBURGER.